Dec. 10, 1963  L. P. CROSET  3,113,442
SHAFT COUPLINGS

Filed July 13, 1962  2 Sheets-Sheet 1

INVENTOR
LOUIS PAUL CROSET
By
Irvin S. Thompson
ATTY.

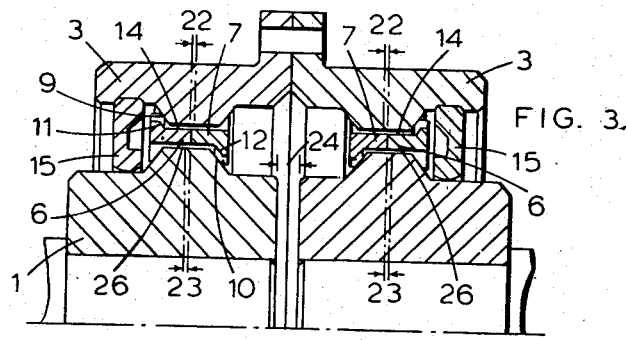
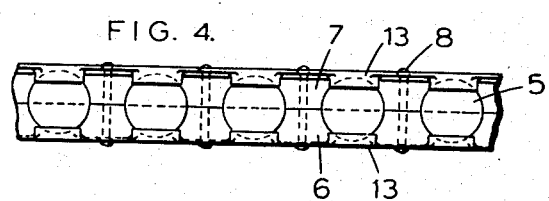
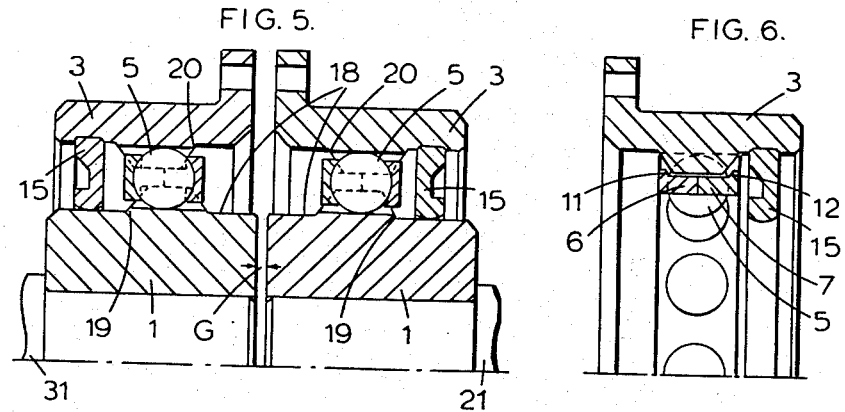
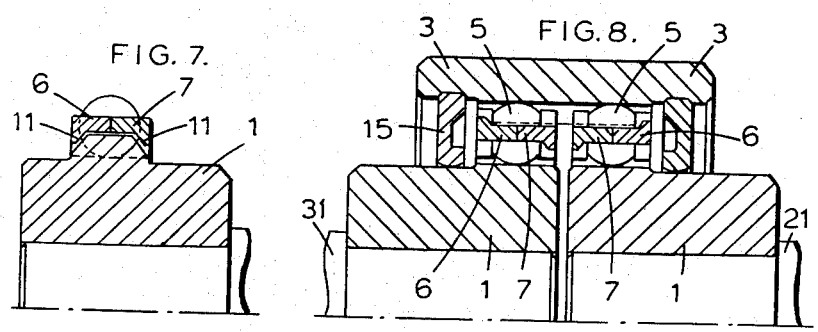

3,113,442
SHAFT COUPLINGS
Louis Paul Croset, Fixby, Huddersfield, England
(Im Schleipfenacker 10, Forch/ZH., Switzerland)
Filed July 13, 1962, Ser. No. 209,624
Claims priority, application Great Britain July 20, 1961
8 Claims. (Cl. 64—8)

This invention relates to shift couplings of the so-called flexible or self-aligning type for connecting shafts with allowance for some substantial relative axial movement between the shafts and also for allowing some slight angular misalignment generally not exceeding one degree out of alignment. Such misalignment can arise on initial installation of shafting or during use due, for example, to changes of temperature, wear of bearings, and vibration.

Toothed couplings are known for this purpose having teeth on one annular part which engage slidably in teeth on another annular part. These couplings have proved useful in many applications but have failed in marine and other applications operating at high rotary speeds with high torques and considerable end-float, even with a fraction of 1° of misalignment due to wear of the teeth through fretting and in some cases actual seizing up.

Ball type couplings have been proposed but have not proved successful in practice except for the ball type coupling described in my British patent specification No. 839,894 in which, however, whilst free to roll in the grooves axially, the balls are not constrained to rotate in a true plane transverse to the axis of rotation.

According to the present invention the coupling comprises two units each comprising a hub member having an external annular set of part circular grooves parallel to the axis of the hub member, an outer member having an internal set of part circular grooves surrounding the first set, a set of balls located in the two sets of grooves, and a cage locating the balls; said cage having a set of recessed members on each side of the balls so that each ball is located between part-spherical recesses of two recessed members; said cage also having projections which engage stop faces on one or both of said members for the purpose of limiting the axial movement of the cage and thus limiting the axial rolling movement of the balls in the grooves and also for limiting the axial movement of the outer member relative to the hub member.

A constructional form of the invention is illustrated in the accompanying drawings, wherein:

FIGURE 1 is a section of a coupling made in accordance with the invention at right angles to the axis; and FIGURE 2 is a view thereof partly in axial section and partly in elevation.

FIGURE 1, left-hand side, is a section on D—D, and right-hand side, a section on E—E on FIGURE 2. FIGURE 2, upper left-hand part, is a section on A on FIGURE 1; the upper right-hand part is a section on B; and the lower left-hand part is a section on C on FIGURE 1. FIGURE 3 is a half section on B on FIGURE 1;

FIGURE 4 is a developed view of the cage and ball unit;

FIGURE 5 is a view similar to part of FIGURE 2 but showing how the outer sleeves can be moved apart to permit check of the alignment of the hubs and of the gap G (FIGURE 2) at the time of installation; and FIGURES 6, 7 and 8 show modified constructions.

Figure 1:
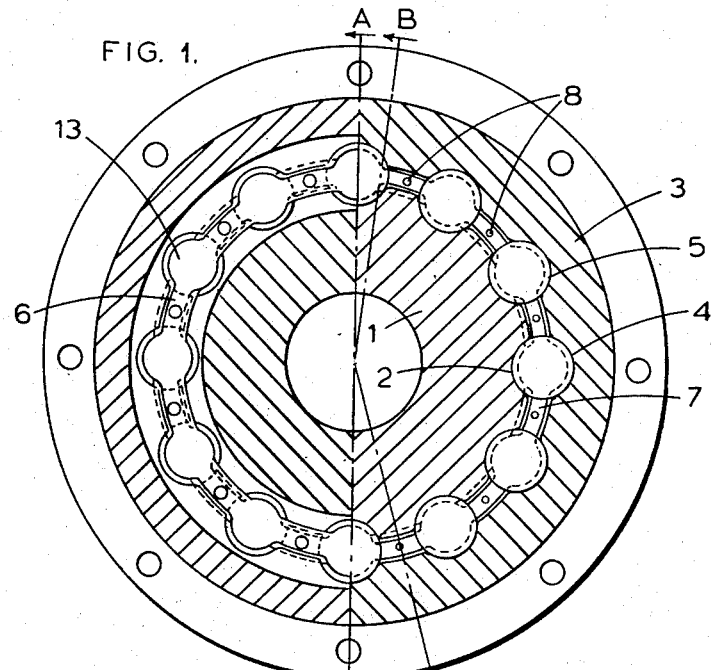

The coupling comprises two hub members 1, 1 each having an annular set of grooves 2 parallel to the axis of the hub members and part circular in cross-section and surrounded by two outer members 3, 3 which are bolted together at 30. Each outer member has an annular set of inwardly directed part circular grooves 4.

The hub members 1 are mounted on shafts 21, 31 to be connected together. The grooves 2 are formed externally on an annular projection or shoulder, and the grooves 4 are formed on an internal annular projection or shoulder. Two annular sets of balls 5 which are the torque transmitting elements engage said grooves 2, 4 each set being maintained in one plane by a cage formed of cage halves 6 and 7, fixed together by rivets 8. The cage halves meet in a plane through the balls at right angles to the axis of the coupling. The cage half 6 has external lips 11, the cage half 7, internal lips 12. These lips are located in each space between adjacent balls. The external shoulder of hub 1 and internal shoulder of sleeve 2, into which the grooves are cut, are tapered or chamfered at 9 and 10, in order to keep the width of the cage to a minimum. The said cage lips 11, 12 are chamfered to the same angle as the shoulders 9, 10. The lips 11, 12 can engage the shoulders or stop faces 9, 10 to limit the movement of the cages (and therefore also of the balls) in the groove (axially of the grooves) to a desired value.

In order to retain the balls in position within the cage upon assembly, each half cage carries an annular set of recessed members or circular bosses 13. The bosses 13 have spherical recesses to conform to the ball diameter, said bosses having a diameter preferably about 60 to 80%, e.g. 75%, of the ball diameter. The central portion of the cage halves, as shown in section B at the right-hand of FIGURE 2, has a thickness preferably about 25% of the ball diameter, a corresponding gap between the grooves of hubs 1 and sleeves 3 being provided. The external diameter of the cage halves at 14 is preferably a close fit within the bore of the ball track of the outer sleeve, the clearance between the internal diameter of the cage and the external diameter of the ball track of the hub being such as to permit a slight angle of tilt which should preferably not exceed about one degree, or the ball track of the hub may be of spherical shape to accommodate such tilt. The number of rivets 8 between each alternate ball corresponds to the number of balls used in the coupling. Lubricant retaining seals 15, preferably in the form of oil resisting synthetic rubber mouldings, engaging grooves 16, in sleeve 3, are a close fit with hubs 1, at 17. The lubricant retaining rings 15 have no other function and are, therefore, not subjected to any axial pressure and their simple insertion into grooves 16 or other retaining means is sufficient.

Figure 2:
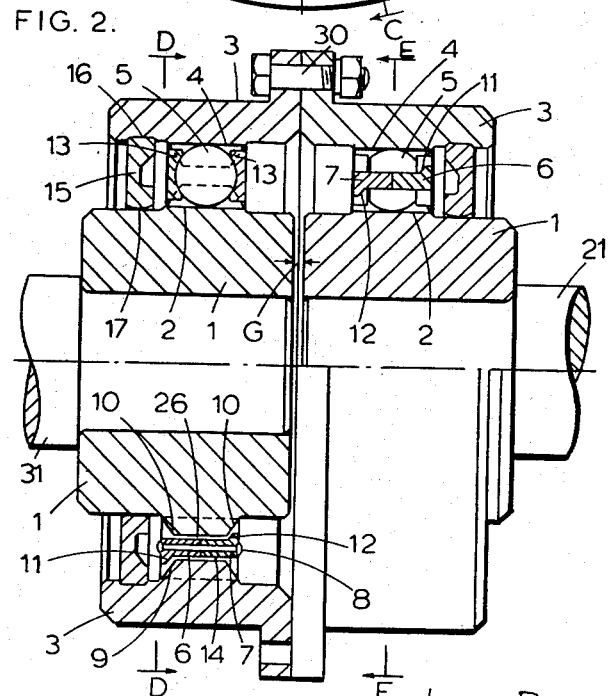

Further, FIGURE 3 shows that the ball cages permit adequate axial relative displacement of the hubs 1 within the sleeve 3, to accommodate any reasonable variation of the normal gap G due to wear of the locating bearings of the shafts 21, 31, or faulty original assembly of the coupling when the specified gap was not observed. It will be seen that the abutment of the external lip 11 of the ball cage against sleeve shoulder 9 and that of the internal lip 12 against shoulder 10, permits an outward displacement 23 of each hub relative to the sleeve, the nominal gap G between the two hubs 1, FIGURE 2, being increased by a corresponding amount. Should the displacement of the hubs 1 be inward, for any reason, this can continue until actual contact of the two hubs occur. In the correctly installed coupling, with the specified gap G between the hubs, the outer sleeve assembly has a free axial float in either direction equal to the clearance spaces between the external and internal lips and groove shoulders as shown in FIGURE 2.

FIGURE 4 shows a developed view of the cage and ball unit, the cage halves being preferably precision castings made by the lost wax process, in any suitable material, or die castings in any suitable material, preferably zinc or yellow metal, which do not require any machining, a permanent assembly of the two cage halves 6, 7 being preferably effected by means of the rivets 8.

The cage on the side with the inward lips 11 is of such size as to be slidable into the outer member 3 while the cage on the side with the outward lips 12 is of such size as to be slidable over the hub member 1.

The assembling of the coupling is effected in the following manner. The hub members 1, 1 are mounted on the shafts 21, 31 and the seals 15 are inserted, or the seals 15 may be fitted before mounting the hub members on the shafts. The two sets of ball and cage devices are separately assembled and are placed as units on the hub members. The outer members 3 are then placed in position over the cages.

Whilst in the double engagement coupling shown in FIGURES 2, 3 and 5 ball cage halves with external and internal locating lips are used in order to provide a limitation to the actual movement of the sleeve 3, 3 in relation to the hubs; or vice versa, a ball cage assembly may be provided as shown in FIGURE 6 in which two cage halves 6, 7 with external locating lips 11, 12, are used, the cage halves with the balls being assembled in position on the sleeve 3. The lips all extend radially outwardly to engage the outer member 3 in both axial directions and the internal diameter of the cage is such that the cage can slide over the hub member. FIGURE 7 shows another variation in which the cage is formed of two halves 6, 7 with internal locating lips 11, 12. These parts 6, 7 are assembled upon the hub 1 together with the balls, and form a unit with the hub 1. The lips all extend radially inwardly to engage the hub member in both axial directions and the external diameter of the cage is such that the cage can slide into the outer member.

The cage serves for maintaining the balls at all times in a true radial plane (a) limiting the axial movement of the cage and ball assembled within desired limits, by means of internal and/or external lips, and (b) also limiting the relative axial float or movement of the sleeve relative to the hub. There are no additional means such as circlips or springs or screwed locating plates, and the entire assembly of a hub, ball and cage unit, outer sleeve and seal, can be carried out manually, i.e. without the need of any special tools whatsoever, as required in other constructions of couplings.

In the modification shown in FIGURE 8 the two outer members 3, 3 are integral with each other, this having the advantage of low inertia which makes it more suitable for high speeds of rotation.

I claim:

1. A shaft coupling comprising two units each having a hub member provided with an external annular set of part annular grooves parallel to the axis of the hub member, an outer member having an internal set of part circular grooves surrounding said external annular set of grooves, a set of balls located in said external annular sets of grooves and said internal set of grooves, and a cage locating the balls; said cage having a set of recessed members on each side of the balls so that each ball is located between part-spherical recesses of two recessed members; said cage also having projections which engage stop faces on one or both of said members for the purpose of limiting the axial movement of the cage and thus limiting the axial rolling movement of the balls in the grooves and also for limiting the axial movement of the outer member relative to the hub member.

2. A shaft coupling as claimed in claim 1, wherein the outer members of the two units are integral with each other.

3. A shaft coupling as claimed in claim 1, wherein the projections are in the form of lips between the recessed members on each side of the cage.

4. A shaft coupling as claimed in claim 3, wherein the lips on one side of the cage project radially inwardly of the cage and the lips on the other side project radially outwardly, the cage on the side with the inward lips being of such size as to be slidable into the outer member while the cage on the side with outward lips is of such size as to be slidable over the hub member.

5. A shaft coupling as claimed in claim 1, wherein the cage is formed in two halves meeting in a plane through the balls at right angles to the axis of the coupling.

6. A shaft coupling as claimed in claim 1, wherein the projections are in the form of lips between the recessed members on each side of the cage and wherein the grooves are formed in tapered shoulders on the hub members and outer members and the meeting surfaces of the lips and said members are chamfered to the same angle as each other.

7. A shaft coupling as claimed in claim 1, wherein the projections are in the form of lips between the recessed members on each side of the cage and wherein the lips all extend radially outwardly to engage the outer member in both axial directions and the internal diameter of the cage is such that the cage can slide over the hub member.

8. A shaft coupling as claimed in claim 1, wherein the projections are in the form of lips between the recessed members on each side of the cage and wherein the lips all extend radially inwardly to engage the hub member in both axial directions and the external diameter of the cage is such that the cage can slide into the outer member.

References Cited in the file of this patent

UNITED STATES PATENTS

| | | |
|---|---|---|
| 2,313,279 | Suczek | Mar. 9, 1943 |
| 2,897,660 | Croset | Aug. 4, 1959 |
| 2,983,118 | Wicoff | May 9, 1961 |

FOREIGN PATENTS

| | | |
|---|---|---|
| 377,761 | Great Britain | Aug. 4, 1932 |